RE 26027

Jan. 2, 1962      E. W. MANTEUFFEL      3,015,739

DIRECT-CURRENT CHARGED MAGNETIC MODULATOR

Filed Oct. 31, 1958      2 Sheets-Sheet 1

Inventor:
Erich W. Manteuffel,
by Allen E. Amgott
His Attorney.

Jan. 2, 1962 E. W. MANTEUFFEL 3,015,739
DIRECT-CURRENT CHARGED MAGNETIC MODULATOR
Filed Oct. 31, 1958 2 Sheets-Sheet 2
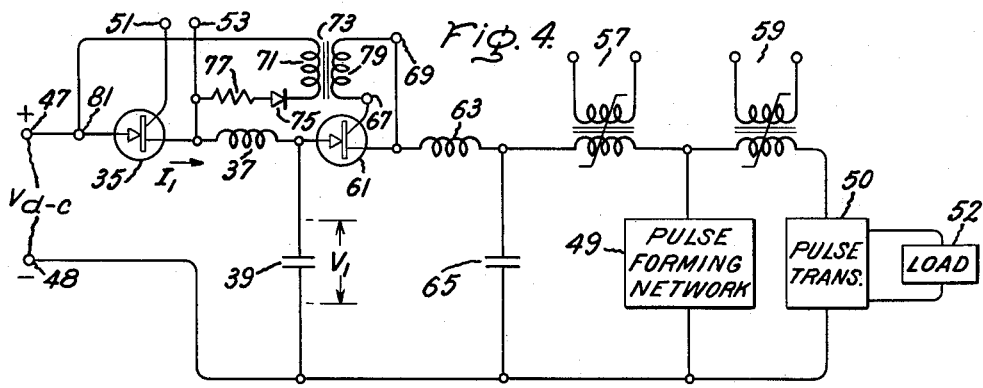
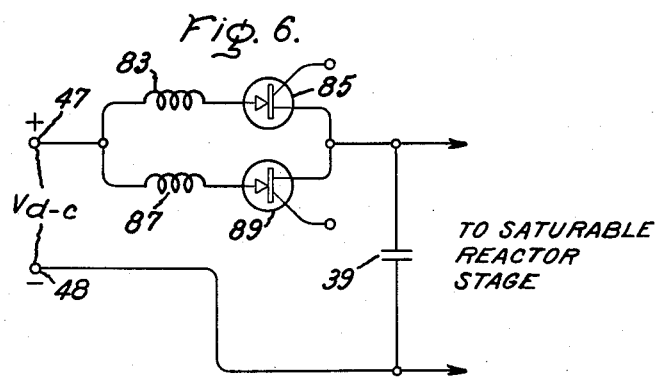
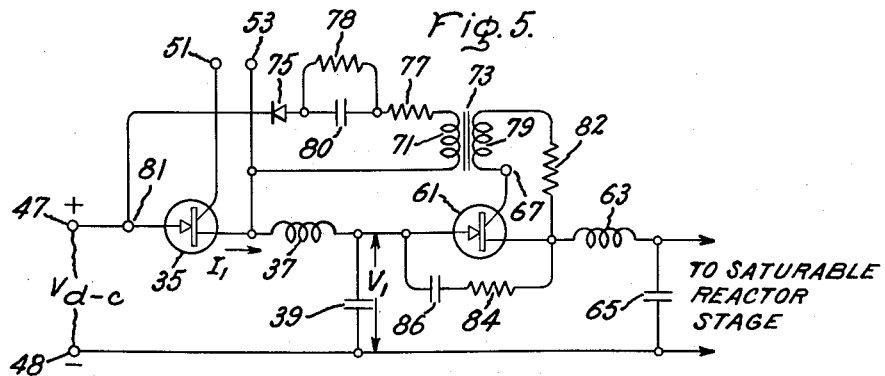
Inventor:
Erich W. Manteuffel,
by Allen E. Amgott
His Attorney.

US United States Patent Office 3,015,739
Patented Jan. 2, 1962

3,015,739
DIRECT-CURRENT CHARGED MAGNETIC
MODULATOR
Erich W. Manteuffel, Ithaca, N.Y., assignor to General
Electric Company, a corporation of New York
Filed Oct. 31, 1958, Ser. No. 771,135
3 Claims. (Cl. 307—88.5)

The present invention relates to magnetic modulators and more particularly to direct-current charged magnetic modulators.

Modulators of the "line type" in which thyratrons are employed as switches have been devised. However, such modulators have inherent disadvantages. The thyratron tube has a definite life and hence the life of the modulator is thereby limited. Further, high voltage power supplies used in conjunction with such modulators have a limiting life factor that contributes to unreliability of the modulators. This high-voltage power supply includes a power transformer and two vacuum-tube rectifiers. Said vacuum-tube rectifiers are subject to unreliability and will also limit the life of the modulators. Still further, a reverse current diode is generally incorporated in such modulator systems, said diode also having a limited life.

A magnetic pulse generator has been devised and was described in an article in the Proceedings of the Institute of Electrical Engineering, vol. 98, Part III, No. 53, pages 185–207, dated May 1951, entitled: "The Use of Saturable Reactors as Discharge Devices for Pulse Generators," by W. S. Melville. This generator is commonly referred to as a "series-type" magnetic pulse generator and is widely used due to its flexibility in design. However, this generator requires a power source having a frequency repetition rate that is equal to the pulse repetition rate of the generator. Thus, an alternating current source having a high frequency repetition rate must be used, such as, a rotating alternator or a magnetic frequency multiplier. The latter has considerable weight and for high frequency ratios has a very poor power factor. Still further, such a generator would have a prohibitively high weight if built for low-speed operation, and, if built for high speed operation, the bearing life is limited and introduces unreliable operation problems. In addition, the voltage and frequency of the power source must be kept to very close tolerances in order to provide jitter-free operation in the radar system in which the generator is incorporated.

One object of the present invention is to provide a magnetic modulator that overcomes the above-mentioned disadvantages.

Another object of the invention is to provide a direct-current charged magnetic pulse generator for use in radar systems.

A further object of the invention is to provide magnetic means that utilizes the non-linear properties of ferromagnetic materials as the basis for generating pulses suitable for firing a magnetron.

A still further object of the invention is to provide in a radar modulator means for direct-current charging of a series resonant inductor-capacitor network.

Still further, it is an object of the invention to provide a silicon controlled rectifier in a D.-C. charged magnetic radar modulator.

Other objects and many of the attendant advantages of the invention will be readily appreciated as the same becomes better understood with reference to the following detailed description when considered in connection with the accompanying drawings wherein:

FIGURE 4 is a schematic wiring diagram of a second embodiment of the invention illustrating a direct-current charged magnetic pulse generator.

FIGURE 5 is a schematic wiring diagram of a modified embodiment of a portion of the charging circuitry shown in FIGURE 4.

FIGURE 6 is an alternate arrangement for the charging circuitry shown in FIGURES 4 and 5.

Figure 1:
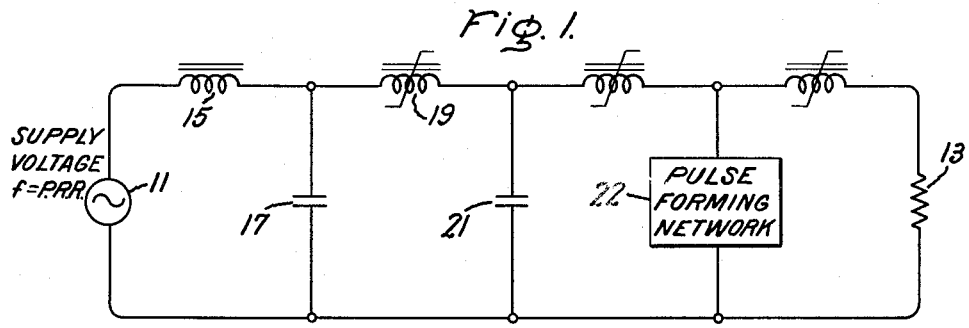
FIGURE 1 is a schematic wiring diagram of an A.-C. series-type magnetic pulse generator.

In FIGURE 1 there is shown an A.-C. charged magnetic pulse generator of the series-type as described by W.S. Melville (cited hereinbefore). As shown therein, the circuit comprises an A.-C. supply source 11 having a pulse repetition rate $f$ connected to a series inductor-capacitor network which ultimately supplies a load 13.

The operation of the circuit is as follows: A sine wave voltage is applied to an A.-C. resonant charging network including linear reactor 15 in series with capacitor 17. When the voltage across the resonant charging capacitor 17 is at its maximum, the saturable reactor 19 saturates, and effectively acts as a switch. This permits the energy stored in the A.-C. resonant charging capacitor 17 to be passed along, neglecting losses, to the capacitor 21. In the transfer process, the original sine wave is shaped into a half sine wave voltage. This energy transfer is carried on in as many saturable reactor stages as required to narrow the successive half sine waves to the approximate pulse and value. The pulse is finally shaped to the proper shape required by a pulse forming network 22.

As mentioned hereinbefore, use of an A.-C. resonant charging network requires a power supply having a frequency equal to the pulse repetition rate of the generator. However, to accomplish this a magnetic frequency multiplier or alternator must be employed. Such a unit adds considerable weight and size to the modulator which is undesirable in many applications requiring a minimum of weight as one of the design features.

To overcome this weight problem, circuitry which uses a D.-C. resonant charging principle was developed by Melville. However, use of a thyratron as a switching element was required. Thus, there was employed relatively unreliable components. The current limitations of the thyratron would require the use of a high voltage supply as mentioned hereinbefore which would be of little advantage in using magnetic principles.

In brief, applicant's invention permits the use of D.-C. charging without the penalties imposed by requiring a hydrogen thyratron and a high voltage power supply as disclosed by Melville. This invention incorporates a silicon controlled rectifier in a D.-C. charged magnetic radar modulator. Such a device is in the semi-conductor class and is more reliable than a thyratron. It is a semiconductor device of the PNPN type consisting of three rectifying junctions namely, a cathode, anode and gate. Avalanche breakdown of the center junction (gate) is achieved by applying an appropriate trigger signal to the "gate" lead which consists of an ohmic contact to the center P region. Breakdown occurs at speeds approaching a microsecond, and after breakdown the gate no longer has control and the action is quite similar to the loss of a grid control in a thyratron. Thus, this device is extremely suitable for the particular application to be hereinafter described and is capable of switching a large current with a small amount of power making the device extremely suitable for use in magnetic modulators. In accordance with one aspect of the invention, there is provided the combination comprising a silicon controlled rectifier in conjunction with an inductor-capacitor network and one or more saturable reactor stages.

Figure 2:
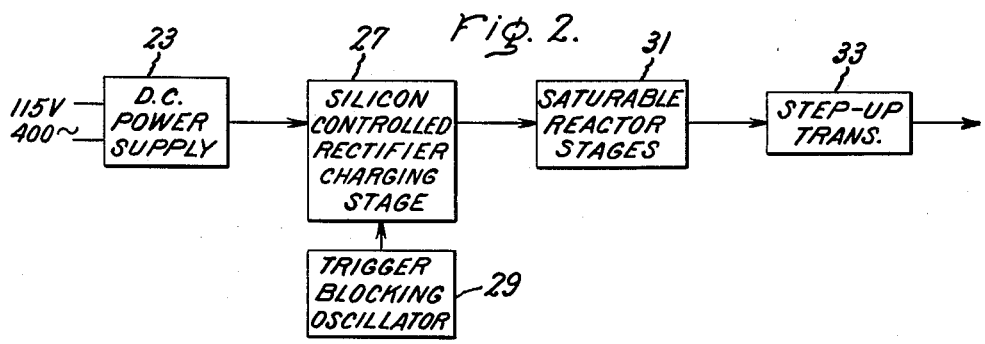
FIGURE 2 is a block diagram of one embodiment of the present invention.

In FIGURE 2 there is shown a block diagram of a magnetic modulator incorporating this invention. 400 cycle, 115 volts, alternating current is connected to a D.-C. power supply converter 23. The D.-C. output voltage of said power converter 23 is fed to a silicon controlled rectifier charging stage 27 to which there is also applied triggering pulses from a conventional trigger blocking oscillator 29. The output of charging stage 27 is fed to a plurality of saturable reactor stages 31 which in turn feed step-up transformer 33 from which output pulses are derived for supplying a magnetron. D.-C. power converter 23 can consist only of a silicon power rectifier in which there can be utilized the silicon controlled rectifier and very simple filtering means. Trigger circuit 29 is of conventional design presently used in magnetic modulators.

Figure 3:
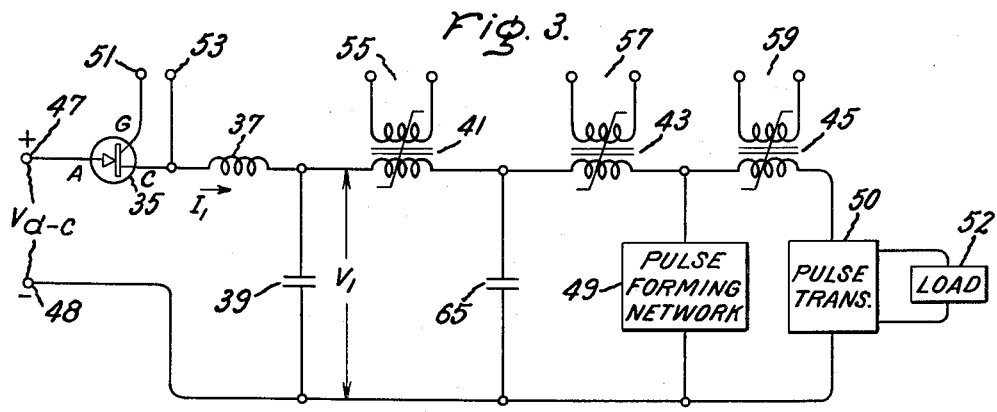
FIGURE 3 is a schematic wiring diagram of one embodiment of the magnetic pulse generator incorporating the silicon controlled rectifier of FIGURE 2.

In FIGURE 3 there is shown one embodiment of the invention which utilizes non-linear properties of ferromagnetic materials as a basis for generating pulses suitable for firing a magnetron. Saturable reactors are used as switching elements. The circuit comprises a silicon controlled rectifier 35 coupled to an inductor-capacitor resonant circuit consisting of inductor 37 and capacitor 39 and a plurality of saturable reactor stages 41, 43, and 45 serially connected as shown. A D.-C. voltage $V_{d-c}$ is applied to the input terminals 47 and 48 of the circuit.

In operation, the silicon controlled rectifier 35 is switched on from trigger pulses applied to junctions 51 and 53 of rectifier 35. Said trigger pulses are repeated at the pulse repetition frequency determined by a small power source (not shown) of stable frequency. During one half cycle of natural frequency of inductor 37 and capacitor 39, the voltage on capacitor 39 will rise to approximately twice the value of the direct current supply voltage $V_{d-c}$. Capacitor 39 charges through inductor 37 in the usual manner. The actual ratio of $V_1/V_{d-c}$ will be determined by the losses occurring within rectifier 35 and inductor 37. In the ideal case where no losses exist, the voltage $V_1$ across capacitor 39 would be two times the supply voltage $V_{d-c}$ at the end of the first half cycle. At this instant the current $I_1$ within the series-resonant circuit becomes zero, resulting in a sudden return to the non-conducting state of the control rectifier 35. Capacitor 39 is then charged to the voltage $V_1$ and a reverse voltage $V_1-V_{d-c}$ will appear across rectifier 35.

Immediately after voltage $V_1$ reaches its maximum value, saturable reactor 41 whose unsaturated impedance is designed to be many times larger than the impedance of inductance 37 becomes saturated. This means that the voltage on capacitor 39 will be transferred to capacitor 65 within one half cycle of the natural frequency determined by the saturated inductance $L_{s1}$ of saturable reactor 41 and the series capacitance C will be:

$$C = \frac{C_{39} \times C_{65}}{C_{39} + C_{65}}$$

If $L_{s1}$ is made much smaller than the inductance $L_1$ of inductor 37, then the time for charging capacitor 65 will be much shorter than the time for charging capacitor 39. By using a chain of saturable reactors as indicated by 41, 43 and 45, and using a conventional pulse-forming network 49 and a pulse transformer 50 which feeds a load 52, the time of discharge can be compressed more and more and the peak discharge current will be increased until a very high pulse current of extremely short duration will be supplied to the load 52. Such a load may be a magnetron or a traveling wave tube. Windings 55, 57 and 59 associated with saturable reactors 41, 43 and 45, respectively, are bias windings which are necessary to reset the reactors during the time where no discharge takes place. Such time is a relatively long inter-pulse period. The time for charging capacitor 39 during the one-half cycle of the natural frequency is $t = \pi\sqrt{L_1 \times C_1}$, where $C_1$ is the capacitance of capacitor 39. This time should be shorter than the time elapsing between the trigger pulses which serve to fire silicon controlled rectifier 35 and the arrangement will allow complete discharge of capacitor 39 before a new charging is initiated.

It will be appreciated by those skilled in the art that the circuitry as shown in FIGURE 3 permits a source of relatively low D.-C. voltage to be used to supply a modulator. Although the circuit arrangement illustrated shows inductor 37 to be serially connected to capacitor 39, this circuit can operate equally well where inductor 37 is inserted between terminal 47 and the anode junction of rectifier 35. Further, because the controlled rectifier requires a source of very small power for triggering, the frequency of this source can be kept much more stable than the frequency of an A.-C. source required to furnish the full power to the A.-C. modulator. Thus, where the D.-C. voltage is kept within certain tolerances, jitter of the pulse generator will be minimized and much smaller than in the case of an A.-C. charged magnetic modulator. In addition, the deionization time of rectifier 35 is much smaller than the deionization time of hydrogen thyratrons available commercially and, thus, the reliability of the modulator is greatly improved over modulators employing thyratrons. It is to also be observed that the time for charging capacitor 39 should be much shorter than the time elapsing between two trigger pulses applied to junctions 51 and 53 of silicon controlled rectifier 35 because sufficient time must be available to reset the flux of saturable reactor 41 before a new charging of capacitor 39 is initiated.

It is to be noted that the D.-C. charging modulator circuit as shown in FIGURE 3 requires a relatively high peak current and therefore peak power to be furnished from the D.-C. supply source because the time for charging capacitor 39 must be much shorter than the time between two trigger pulses applied to junctions 51 and 53 of the silicon controlled rectifier. In order to overcome this condition there is shown in FIGURE 4 a second embodiment of the invention in which like numerals designate like portions of the circuitry of FIGURE 3.

As shown in FIGURE 4 a silicon controlled rectifier 35 is connected in series with an inductor 37 and a capacitor 39 to which a D.-C. voltage $V_{d-c}$ is supplied. Connected to the junction of inductance 37 and capacitor 39 is a second silicon controlled rectifier 61 which in turn is connected in series with an inductor-capacitor network including inductor 63 and capacitor 65. Said silicon controlled rectifier 61 has junctions 67 and 69 connected thereto similar to junctions 51 and 53 of controlled rectifier 35.

A series circuit consisting of primary winding 71 of transformer 73, diode 75 and resistor 77 is connected between input terminal 47 and junction 53 of rectifier 35. The secondary winding 79 of transformer 73 is connected across terminals 67 and 69 of silicon controlled rectifier 61. It is to be noted that the remainder of the circuitry is similar to the circuitry as shown in FIGURE 3.

Operation of the circuit is as follows: The circuit consisting of silicon controlled rectifier 35, inductor 37 and capacitor 39 is switched on in the same manner as that of FIGURE 3 by applying a trigger pulse to junctions 51 and 53. The voltage $V_1$ on capacitor 39 after one half cycle of the natural frequency $$\omega_1 = \frac{1}{\sqrt{L_1 \times C_1}}$$

will rise for nearly twice the values of voltage $V_{d-c}$ at which time the current $I_1$ will be zero. At this instant the controlled rectifier 35 will go into its non-conducting state. Thus, suddenly the voltage $V_1-V_{d-c}$ will appear between the cathode and anode junctions 53 and 55 of controlled rectifier 35. By means of a series circuit comprising diode 75 and resistor 77 and primary winding 71 connected between junctions 53 and 81 and by connecting the secondary winding 79 of transformer 73 between junctions 67 and 69 of the controlled rectifier 61, a current pulse will be applied to the gate 67 of rectifier 61. This current pulse initiates the conduction of said controlled rectifier at the time where the voltage $V_1-V_{d-c}$ appears at junctions 51 and 81.

After the time $t_2$ $$\left(t_2 = \pi\sqrt{C_0 \times L_{63}}, \text{ where } C_0 = \frac{C_{39} \times C_{65}}{C_{39} + C_{65}}\right)$$

said time $t_2$ being made by proper design of inductor 63 much shorter than time $t_1$ ($t_1 = \pi\sqrt{C_{39} \times L_{37}}$) necessary for charging capacitor 39, the charge on capacitor 39 will be transferred to capacitor 65. The operation of the transfer of the charges from capacitor 65 to the load circuit 53 is the same as described hereinbefore with reference to the transfer of charges in FIGURE 3.

It will be understood by those skilled in the art that the time allowed for the charging of capacitor 39 can be made larger and that therefore the peak power required to be furnished to terminals 47 and 48 from the D.-C. supply will be reduced. If T is the time elapsing between two trigger pulses applied to junction 51 of controlled rectifier 35, the relationship $t_1 \leq T - t_2$ should exist where $t_2$ is very much smaller than $t_1$. This condition will permit complete discharge of capacitor 39 before it is charged again.

In FIGURE 5 there is illustrated an alternate embodiment of a portion of the circuitry as shown in FIGURE 4 which performs in a fail-safe method and prevents any undesirable firing of controlled rectifier 61. Inserted between diode 75 and resistor 77 is a capacitor 80 of small value shunted by a discharge resistor 78 of high resistance. By the introduction of capacitor 80 and resistor 78 a much shorter and sharper current pulse into the gate circuit of controlled rectifier 61 is achieved and eliminates the possibility of undesirable firing of rectifier 61 where rectifier 35 had not completely ceased to conduct.

Overvoltage protection means in the form of a series circuit including resistor 84 and capacitor 86 is shunted across the anode and cathode junctions of controlled rectifier 61. This series circuit acts as a shunt to protect controlled rectifier 61 against excessive reverse voltages. The ohmic value of resistor 84 should approximate the value of $$R_{84} = 2\sqrt{\frac{L_{63}}{C_{86}}}$$

for the condition of critical damping.

In FIGURE 6 there is shown a pair of series cicruits consisting of inductor 83 and silicon controlled rectifier 85, and inductor 87 and silicon controlled rectifier 89 in parallel with each other and in series with capacitor 39. While not indicated in FIGURE 6, overvoltage protection means similar to the series circuit comprising resistor 84 and capacitor 86 of FIGURE 5 can be shunted across each of rectifiers 85 and 89. This circuit can be substituted for the charging circuits of FIGURES 4 and 5 where the values of inductors 83 and 85 are each twice the value of inductor 37. It will be recognized that this circuit is the equivalent of the charging circuits of FIGURES 4 and 5. The current in both controlled rectifiers 85 and 89 will then be practically equal if they are triggered simultaneously. In this manner no damage of the rectifiers will result.

While particular embodiments of the invention have been shown and described herein, it is not intended that the invention be limited to such disclosure, but that changes and modifications can be made and incorporated within the scope of the claims.

What is claimed is:

1. A direct-current charging circuit comprising a first silicon controlled rectifier having an anode, cathode and gate junction, a first series inductor-capacitor network coupled to the cathode junction of said first silicon controlled rectifier, a second silicon controlled rectifier coupled to the junction of said inductor-capacitor network, said second silicon controlled rectifier having an anode, cathode and gate junction, a second series inductor-capacitor network coupled to the cathode junction of said second silicon controlled rectifier, a series circuit including a first inductor and diode connected between the anode and cathode junctions of said first silicon controlled rectifier, a second inductor connected between the gate and cathode junctions of said second silicon controlled rectifier, said first and second inductors being the primary and secondary windings of a transformer, respectively, a source of direct current voltage, said direct current voltage applied between the anode junction of said first silicon controlled rectifier and each of said first and second series inductor-capacitor networks, and means for triggering the gate junction of said first silicon controlled rectifier.

2. The invention as defined in claim 1 including means for transferring the charge accumulated in said second series inductor-capacitor network.

3. The invention as defined in claim 1 wherein said charge transferring means includes a saturable reactor, the unsaturated impedance of which is larger than the impedance of said second inductor.

References Cited in the file of this patent

UNITED STATES PATENTS

| 2,063,307 | Gurtler | Dec. 8, 1936 |
| 2,693,535 | White | Nov. 2, 1954 |
| 2,830,199 | Mofenson | Apr. 8, 1958 |
| 2,876,386 | Fefer et al. | Mar. 3, 1959 |
| 2,877,386 | Johnson | Mar. 10, 1959 |
| 2,909,705 | Husson | Oct. 20, 1959 |
| 2,912,602 | Bownik | Nov. 10, 1959 |
| 2,923,856 | Greene et al. | Feb. 2, 1960 |

FOREIGN PATENTS

| 666,575 | Great Britain | Feb. 13, 1952 |